US009225155B1

(12) United States Patent
Rauckman et al.

(10) Patent No.: US 9,225,155 B1
(45) Date of Patent: Dec. 29, 2015

(54) SAFETY COVER AND IDENTIFIER FOR ELECTRIC TERMINAL BLOCK

(71) Applicants: James B. Rauckman, Swansea, IL (US); David W. McGuire, Jerseyville, IL (US)

(72) Inventors: James B. Rauckman, Swansea, IL (US); David W. McGuire, Jerseyville, IL (US)

(73) Assignee: James B. Rauckman, Swansea, IL (US)

( * ) Notice: Subject to any disclaimer, the term of this patent is extended or adjusted under 35 U.S.C. 154(b) by 309 days.

(21) Appl. No.: 14/017,813

(22) Filed: Sep. 4, 2013

(51) Int. Cl.
*H01R 27/00* (2006.01)
*H02G 3/14* (2006.01)

(52) U.S. Cl.
CPC ....................................... *H02G 3/14* (2013.01)

(58) Field of Classification Search
CPC .. H01R 13/447; H01R 13/652; H01R 13/743; H01R 2103/00; H01R 24/78; H01R 13/6205; H01R 4/2429; H01R 9/26; H01R 9/2683; A24F 13/22; Y10T 24/44291; H02G 3/14
See application file for complete search history.

(56) References Cited

U.S. PATENT DOCUMENTS 3,247,480 A * 4/1966 Orzechowski ....... H01R 9/2475 439/491
3,404,435 A * 10/1968 Freundlich .............. B42F 1/006 24/67.9
3,753,216 A * 8/1973 Johnson ................... H01R 9/26 439/491
3,896,527 A * 7/1975 Miller ..................... A44B 99/00 16/DIG. 13
3,945,706 A * 3/1976 Steiner ...................... G09F 3/06 439/491
4,084,299 A * 4/1978 Noda ........................ A41F 3/02 24/489
4,258,487 A * 3/1981 Hohorst .................... G09F 3/06 40/299.01
4,465,186 A * 8/1984 Meyers .................. A44B 99/00 206/342
4,506,416 A * 3/1985 Ohminato ................. B42F 1/10 24/489
4,536,611 A * 8/1985 Butler .................... H02G 15/18 174/41
4,637,676 A * 1/1987 Simonsen ............ H01R 9/2683 439/488
4,647,715 A * 3/1987 Butler .................. H02G 15/117 138/166
4,714,434 A * 12/1987 Norden ................ H01R 9/2475 439/488
4,797,125 A * 1/1989 Malana ................ A61B 5/0416 439/729
4,881,301 A * 11/1989 Sweeney ............ B65D 33/1658 24/16 PB
5,006,830 A * 4/1991 Merritt ................... A61B 17/12 283/75
5,305,500 A * 4/1994 Tucker ............... B65D 33/1675 24/30.5 P
5,322,980 A * 6/1994 Benda ................ H01H 71/1018 200/43.11
5,419,715 A * 5/1995 Laveissiere .......... H01R 9/2683 439/491
5,638,624 A * 6/1997 Cornu ..................... G09F 3/205 24/456
5,640,742 A * 6/1997 White .................... A44C 3/001 24/18
5,732,921 A * 3/1998 Lemire ................. A47F 5/0006 24/515
5,802,677 A * 9/1998 Dorman ............. B65D 33/1675 24/30.5 P
6,062,915 A * 5/2000 Costello ................. H01R 11/24 439/729
D550,550 S * 9/2007 Lee ................................ D8/395
8,430,681 B2 * 4/2013 Wang ................... A61B 5/0416 439/217
2014/0117976 A1 * 5/2014 Larkin ................. H01R 13/447 174/138 G

* cited by examiner

*Primary Examiner* — Briggitte R Hammond
(74) *Attorney, Agent, or Firm* — Polster, Lieder, Woodruff & Lucchesi, L.C.

(57) ABSTRACT

A safety cover and identifier to cover wire terminals in an electric terminal block. The cover/identifier comprises a body comprising dielectric material having a first leg and an opposed, spaced apart second leg The two legs are joined adjacent their midpoints by an integral, resilient spring element. The opposed proximal ends of the legs each have a terminal covering surface and define serrated jaws. The jaws are opened by compression of the distal ends of the legs. The jaws are attached to the electrical terminal block to cover wire connections and each of the proximal ends covers one of a functional pair of wire connectors. The resilient spring element biases the jaws toward each other to secure the cover in place. The cover/identifier includes indicia to identify aspects of the wires attached to the cover wire connectors.

15 Claims, 4 Drawing Sheets

SAFETY COVER AND IDENTIFIER FOR ELECTRIC TERMINAL BLOCK

CROSS REFERENCE TO RELATED APPLICATIONS

Not applicable

BACKGROUND

The present disclosure relates to safety equipment for men working on electrical power distribution equipment such as terminal blocks in a substation or the like and more particularly to a device for identifying and covering terminal connections in a terminal block to prevent inadvertent disconnection of electrical connections and subsequent power failures.

Terminal blocks (also called terminal strips, connection terminals or screw terminals) are known to the art and provide a convenient means of connecting individual electrical wires without a splice or physically joining the ends. They are usually used to connect wiring among various items of equipment within an enclosure or to make connections among individually enclosed items. Terminal blocks are readily available for a wide range of wire sizes and terminal quantity. They are widely used in electric substations to connect wires from various sources including safety and monitoring equipment.

Terminal Blocks generally are modular, insulated sections that fasten two or more wires together allow wiring to be centralized and make it easier to manage complicated control circuits. When modifications in the circuit must be carried out, terminal blocks can be easily added or removed from a rail without interfering with other wire terminations. In addition to minimizing complexity of control wiring, the plastic frames of terminal blocks also protect against shorts and subsequently provide increased safety to installers and service crews.

One disadvantage is that a substation, for example, can house thousands of connecting wires. The connecting wires are not well marked. Furthermore, the terminals are generally not very well protected from contact with persons or foreign conducting materials. In any event, if a technician erroneously disconnects the wrong wires from a terminal block, it can cause power failure, sometimes a catastrophic cascade of power failure in an interconnected power grid.

It would be advantageous, therefore, to have an apparatus for connecting to a terminal block that both covers those wire connections to prevent inadvertent disconnection of wires and resultant power failure, and indicates which connections should be avoided or worked on.

SUMMARY OF THE DISCLOSURE

A safety cover and identifier is disclosed to cover wire terminals and wire connections in an electric terminal block to prevent inadvertent disconnection of wires and indicate which connections should be avoided or worked on. The cover/identifier comprises a body having a first substantially flat leg and an opposed, spaced apart mirror image second leg The two legs are joined adjacent their midpoints by an integral, resilient spring element. The opposed proximal ends of the legs each define serrated jaws. The jaws are opened by compression of the distal ends of the legs. The jaws are attached to the electrical terminal block to cover wire connections and each of the proximal ends covers one of a functional pair of wire connectors. The resilient spring element biases the jaws toward each other to secure the cover in place.

The cover/identifier includes indicia to identify aspects of the wires attached to the cover wire connectors.

In another aspect, the proximal ends of each leg define an opening for a connector to connect two or more cover and identifiers together side-by-side.

In another aspect, the distal ends of each leg each define an opening for the attachment of a connector or an identifier.

In another aspect the safety cover and identifier is molded from a dielectric material.

In another aspect the safety cover and identifier is provided in predetermined color indicia.

DETAILED DESCRIPTION

The safety cover/identifier disclosed herein is designed to be use with a conventional terminal block. By way of example, it is designed to be used with terminal blocks employed in the high voltage electric distribution industry. One example is electric terminal blocks employed in electric substations and the like. However, it can be used in any environment and is not limited to the high voltage electric distribution industry.

Figure 1:
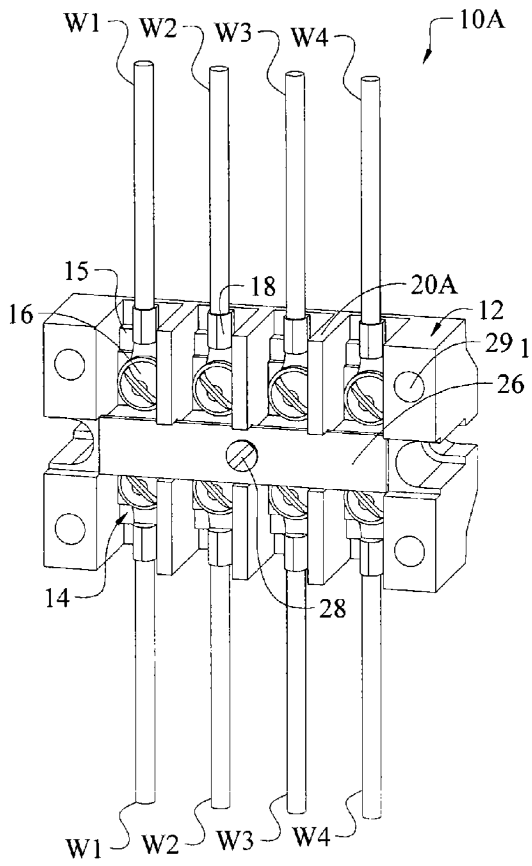
FIG. 1 is a front perspective view of one embodiment of an electric terminal block with connected wires.
Figure 2:
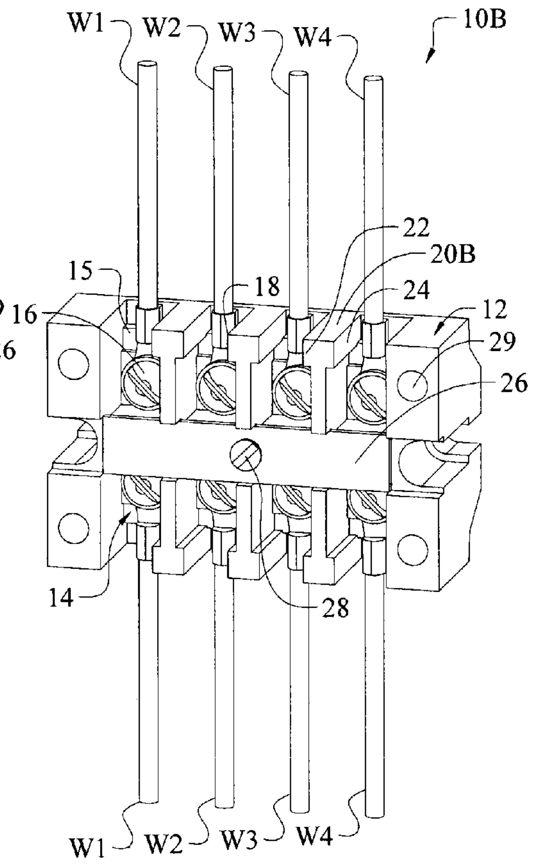
FIG. 2 is a front perspective view of another embodiment of an electric terminal block with connected wires.

Representative examples of terminal blocks are shown in FIGS. 1 and 2 and indicated generally by reference number 10A and 10B, respectively. Terminal blocks can also be referred to terminal strips, connection terminals or screw terminals. Blocks 10A and 10B each include an insulating body 12 that houses the current carrying elements. Body 12 generally is constructed from a dielectric thermoplastic material or ceramic or the like.

The current carrying parts consist of wire terminals 14, including a clamping device 15. As shown, the terminal block includes two banks of opposed wire terminals. Each pair of opposed wire terminals is electrically connected by a current bar (not seen). The current bar, at the core of the insulating body 12, is constructed from copper or brass. The clamping device 15 fastens a wire to a wire terminal 14 in the terminal block, for example with screw 16, and creates a dependable electric connection between the wire and the current carrying bar. The dimensions of the current carrying parts vary in regard to the amperage/wire size and the construction of the block itself. Depending upon terminal block layout, wires can be clamped in position using screws 16 a combination of screws and pressure plates or other appropriate elements.

It will be noted that the terminal block includes a plurality of pairs of wire terminals 14. In the embodiment shown, one wire terminal 14 accommodates a wire, e.g. W1 carrying electric current toward the block and one terminal accommodates a wire carrying electric current away from the block. For purposes of description such a pair of wire terminals may be referred to as a functional pair of wire terminals. Hence, the terminal block serves to connect two sections of a single functional wire though a functional pair of wire terminals joined by a current bar. It will be appreciated that if one of the wires is disconnected from a wire terminal, current flow through the block will stop, with concomitant consequences.

As mentioned above, terminal block 10A or 10B serves to connect two sections of a plurality of pairs of wires W1, W2; W3, W4 and so forth. In the illustrated embodiments of the terminal blocks, the ends of the wires terminate in a metal connector 18 such as a wire clip or metal loops which is attached to the wire terminal 14 by screws 16 so as to be in electrical contact. The number of pairs of wires can vary according to the size of the terminal block, the number of pairs of wire terminals, and the environment and application of use for the terminal block. Suffice to say, that a terminal block or series of terminal blocks in any given environment can connect hundreds or even thousands of pairs of wires.

Each wire terminal 14 is separated laterally from the adjacent wire terminal by a divider or wall 20A in block B1 and wall 20B in block B2. These dividers are constructed from a dielectric material and isolate adjacent wire terminals from each other. As shown, walls 20A in block 10A are substantially flat. On the other hand, walls 20B in block 10B have a substantially T-shaped cross-section defined by shoulders 22 and 24.

There is a center, transverse divider 26 extending the middle length of the block separating the opposed banks of wire terminals. Divider 26 can be integral or can be a flat plate fastened to the block by a screw 28 or other means. Divider 26 delineates one side of the terminal block, with its array of wire terminals, from the other side of the terminal block and its complementary array or wire terminals.

Each representative terminal block includes some means for mounting the terminal block in its useful environment. For example holes 29 in the corners of body 12 can accept screws or nut and bolt combinations or other fasteners to secure the terminal block to a terminal block channel or directly to a structure, or the like. The mounting means is incidental to the disclosure.

Figure 3:
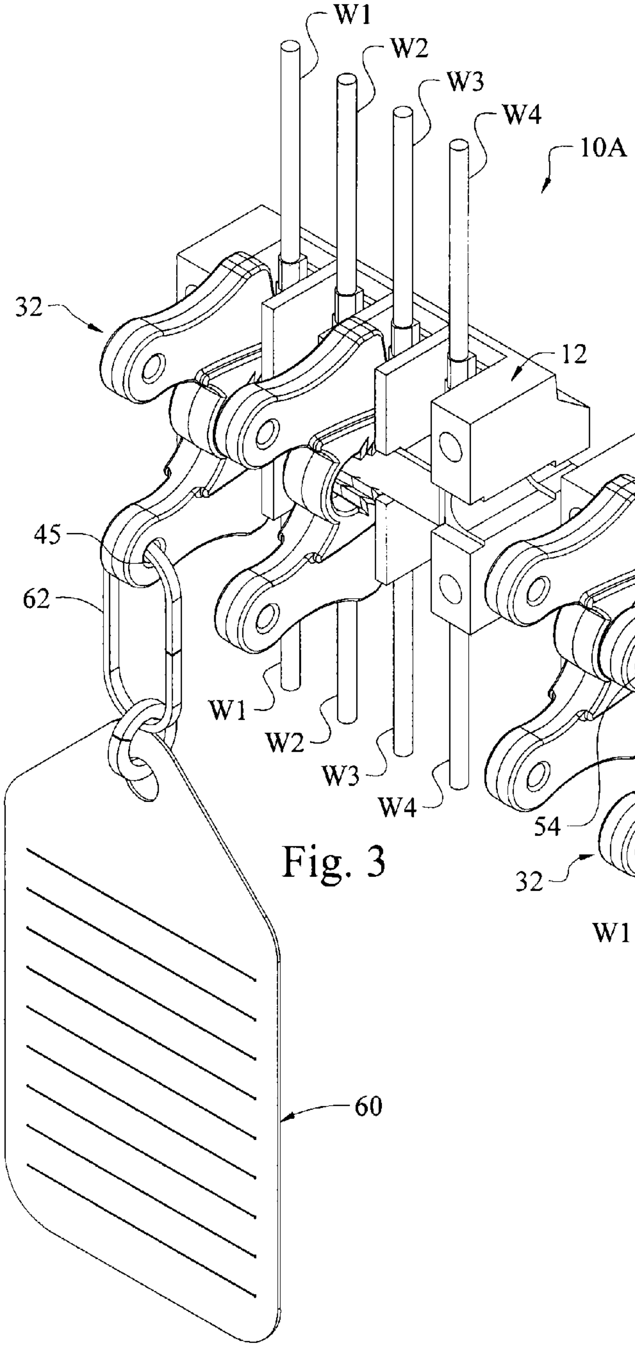
FIG. 3 is a front perspective view of a pair of safety cover/identifiers attached to the terminal block of FIG. 1.
Figure 4:
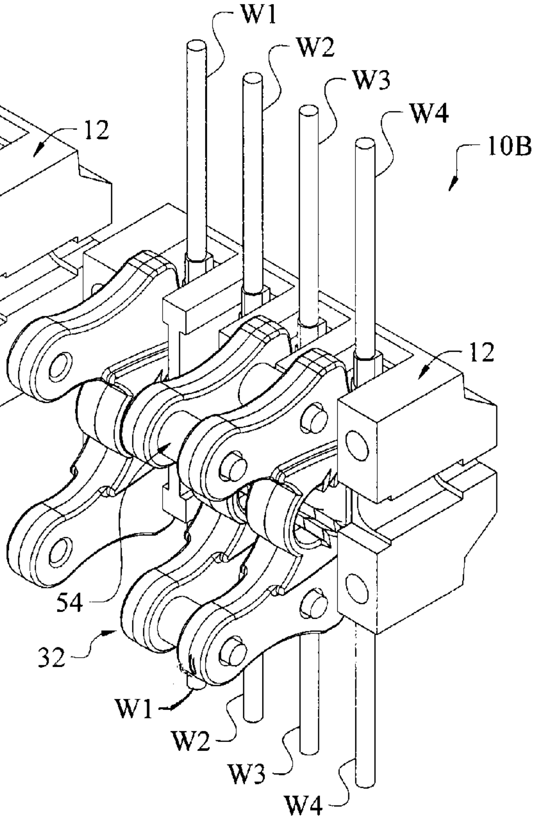
FIG. 4 is a front perspective view of an array of safety covers/identifiers attached to the terminal block of FIG. 2.

As can be seen in FIGS. 1 and 2, and as explained above, the ends of wires W1-W4 with connectors 18 are attached to wire terminals 14 in terminal block 10A and 10B by screws 16. However, the ends of the wires and the wire terminals and screws are exposed. Moreover, an electric substation, for example, may have thousands of wires connected through hundreds of terminal blocks. If a technician is required to work on a terminal block it is possible that he could disconnect the wrong wires, resulting in a catastrophic, cascading power outage. FIGS. 3 and 4 illustrate one aspect of a cover/identifier employed to cover the ends of the wires and the connecting screws 16 and identify the source or other aspects of the wires themselves.

One aspect of the cover/identifier, referred to by reference number 32, is shown in greater detail in FIGS. 5-8. It will be appreciated that cover/identifier 30 is referred to as a cover/identifier for convenience, since it has safety cover aspects and identification aspects. In any event, the cover/identifier may be referred to as a clip, a safety clip, a guard, a clip guard, a connection cover, or any other convenient name without affecting the scope of the instant disclosure. Hereinafter, the disclosed cover/identifier will be referred to as the "device" for purposes of simplicity and clarity. The safety cover aspect of the device will be described immediately below and the identifier aspect of the device will be described hereinafter.

Device 32, as shown, includes a unitary body 33 comprising a first leg 34 and a second opposed leg 36. The respective legs, as shown, are mirror images joined at their approximate midpoints by a resilient spring structure 38. In the illustrated device, spring structure 38 is generally C-shaped, however, any configuration that functions as intended is included within the scope of the disclosure. By way of example only, resilient spring structure 38 could be V-shaped. X-shaped, circular or any other useful configuration.

Device 32 is comprised of a dielectric material, such as a molded plastic material. For example polypropylene or urethane or other plastic materials work well. In a preferred aspect, device 32 is molded as one piece in a cavity mold. However, any method of making the device is acceptable. Moreover, the various elements of device 32 may be constructed separately and assembled.

Figure 5:
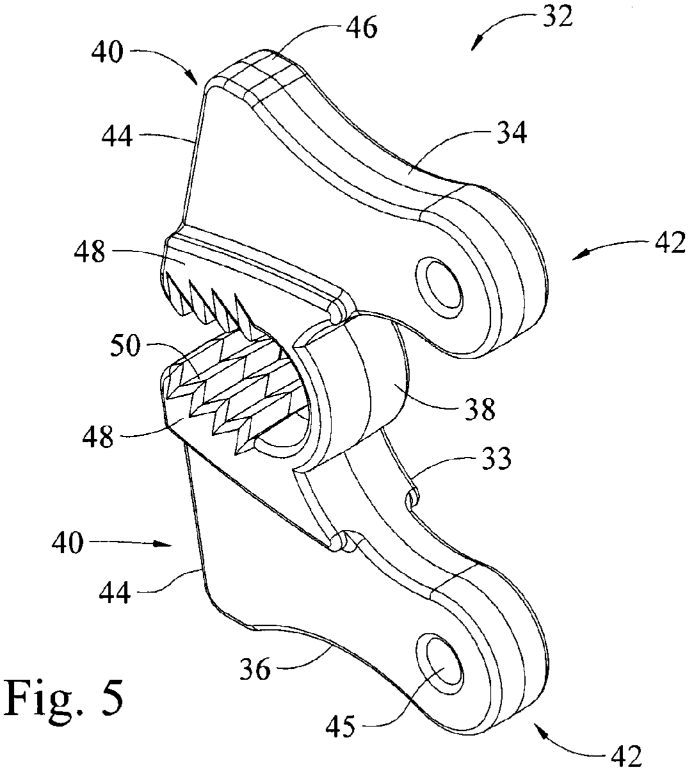
FIG. 5 is a rear perspective view of one aspect of the safety cover/identifier.
Figure 6:
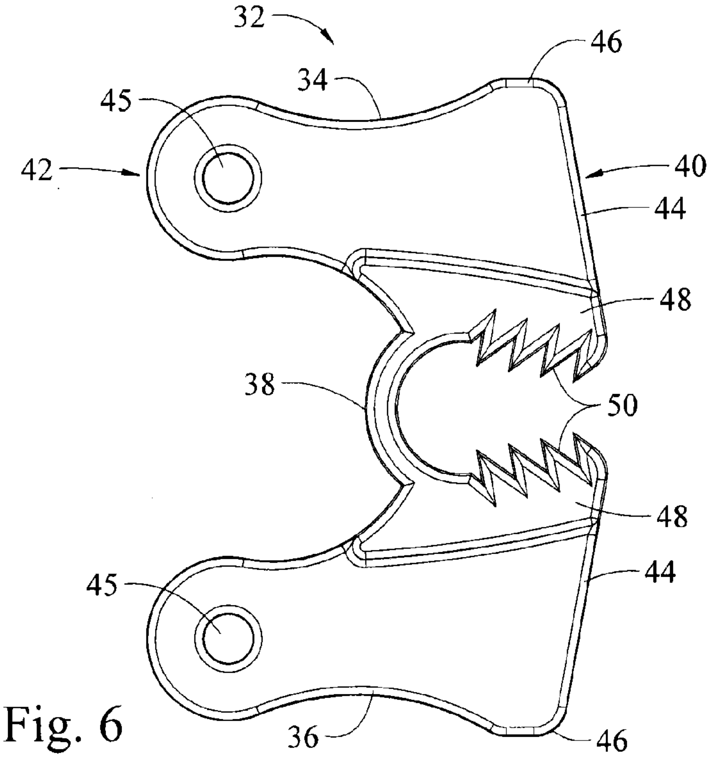
FIG. 6 is a side elevational view of the safety cover/identifier, the opposite side being identical in configuration.

It will be noted that leg 34 and leg 36 are mirror images of each other, although they would not have to be. As best seen in FIGS. 5 and 6, each leg is substantially flat and elongated. Each leg has a proximal end 40 and a distal end 42. The material thickness of each leg is generally uniform along its transverse length. As shown, spring structure 38 is wider than the material thickness of each leg. This relative size relationship provides lateral stability to the device when it is being applied or removed and keeps the legs from twisting at the spring structure. Moreover, it prevents the device from failing at the spring structure due to material fatigue from repeated use.

In any event, in the illustrated aspect the material thickness of the spring structure itself is thinner than the thickness of the legs, such that it is compressible and resilient. The distal ends of the legs can be compressed toward each other but are urged to return toward their original orientation after compressive force is removed by the resilient biasing function of spring structure 38. As seen in FIG. 6, the linear height of proximal end 40 of each leg is greater than that of distal end 42. Proximal end 40 has a substantially flat front face 44. Front faces 44 of the first and second legs each are slightly angled toward the distal ends of the legs and terminate in raised shoulders 46. Each distal end 42 has an ergonomically pleasing rounded profile. In one aspect, distal ends 42 have openings or holes 45 centrally positioned therein.

Each proximal end 40 has a bottom margin 48 with a lateral width approximately the same as the width of spring structure 38. Each bottom margin 48 is contiguous with the spring structure and includes forward serrated surface 50. As shown, the spring structure 38, bottom margins 48, forward serrated surfaces 50 of the two legs cooperate to form a pair of opposed jaws. A user can apply minimal compressive force to the distal ends of the legs to overcome the biased torsional force of spring structure 38 to open the jaws and upon release, the spring structure biases the jaws toward each other so as to apply clamping force on the jaws.

As seen in FIGS. 3 and 4, in use, device 32 is attached to the transverse divider 26. Distal ends 40 of the legs are squeezed to open the jaws. The jaws are positioned over divider 26 until each face 44 of the proximal end of each leg abuts or at least covers or blocks the wire terminal 14, the screw 16 and wire connector 18 so to cover the connected ends of the wires on a functional pair of wire terminals in a terminal block. It will be appreciated that the term "cover" as used herein is intended to mean blocking access to the wire terminal and connected wire whether by abutting the wire terminal or providing a barrier or the like. In any event, the serrated surfaces 50 function as teeth that bite onto divider 26. When compressive force is relieved, spring structure 38 biases the jaws toward each other so that the jaws clamp onto the divider to secure the device in place. The distally angled faces 44 on the proximal ends of the legs provide clearance for the wire terminal and attachment hardware.

As seen in FIG. 4, since the legs are narrower than the spring structure 38, device 32 can easily fit between the lateral walls 20A or 20B, even those walls that have the T-shaped cross-section as shown in FIG. 2. Because the legs are mirror images, the device has no top or bottom which allows for more convenient and rapid installation. A technician does not have to be concerned about proper up or down orientation.

Figure 7:
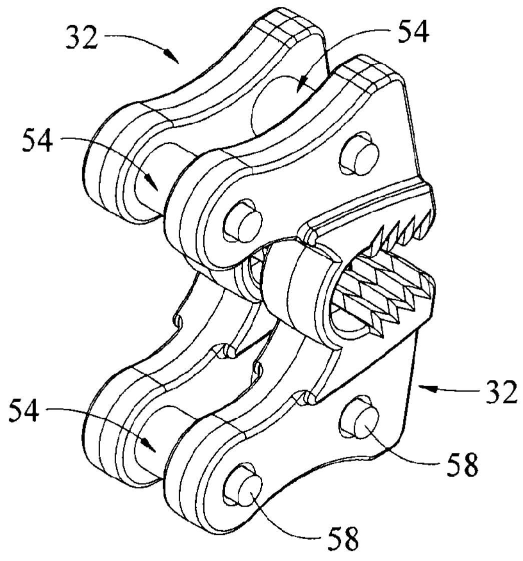
FIG. 7 is a joined pair of the safety cover/identifiers.
Figure 8:
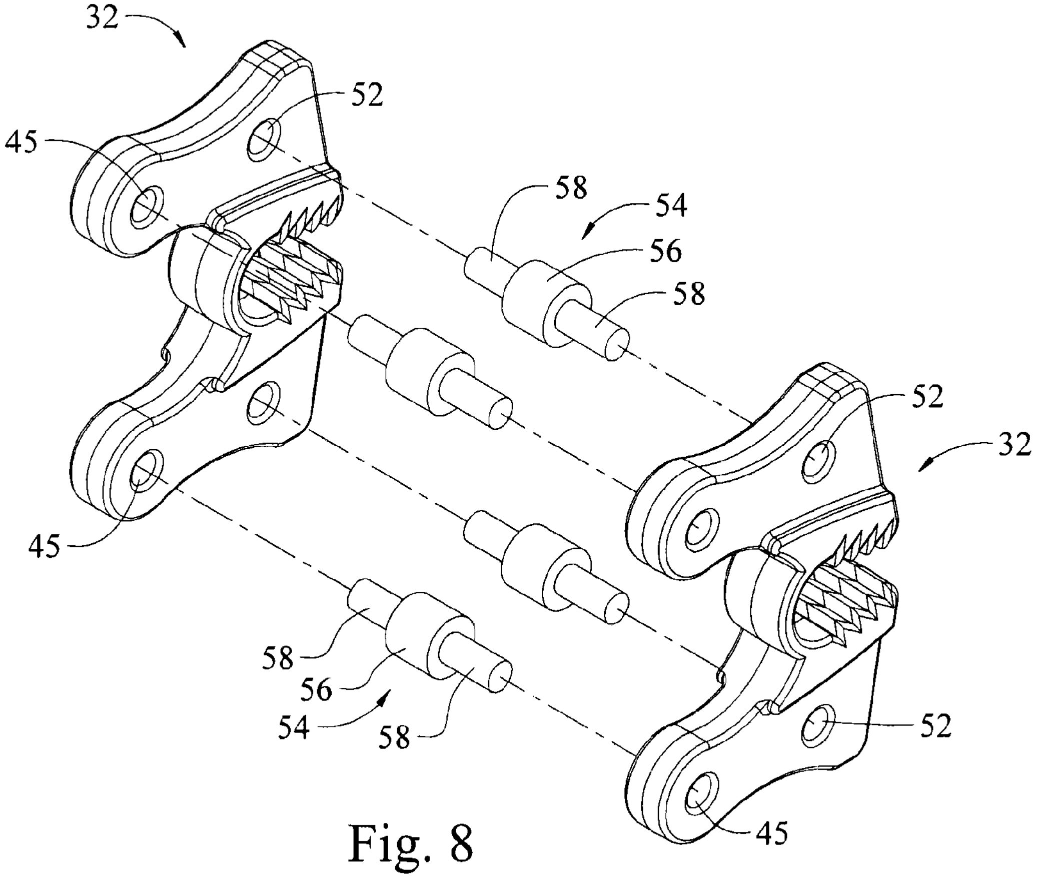
FIG. 8 is an exploded view of the joined pair of safety cover/identifiers of FIG. 7.

FIGS. 4, 7 and 8 illustrate another aspect of device 32. As shown, raised shoulder 46 of each leg include hole 52. Pairs of adjacent devices 32 can be connected by connector pegs 54. Each peg 54 includes a center section 56 with a concentric extension 58 extending out of each side of the center section. The diameters of extensions 58 are such that the fit snugly into holes 45 and 52 in the legs to secure adjacent devices together with a tight friction fit. It should be understood that peg 54 is constructed from dielectric material and can be constructed in any configuration of peg that corresponds to the opening configurations and functions to secure adjacent devices together is within the scope of the disclosure. For example, the holes and peg extensions could be rectangular or triangular or any configuration.

The indicator aspect of device 32 is two-fold and will now be discussed in greater detail. It will be noted that device 32 can be molded in any desired color. Consequently, the color of each device can function as identifying indicia. The devices can be provided in a plurality of identifying colors. By way of example only, device 32 in red could serve as a warning indicator that the wires or wire connections covered by a red device 32 should not be disconnected under any circumstances. Conversely, wires and wire connections requiring service could be covered with green devices. Red and green are mentioned for purposes of illustration only. The devices could be color coded to indicate the electric equipment energized by any given set of wires connected through a terminal block. Suffice to say, color coding of devices 32 could perform myriad identification functions. Hence, the device can be constructed in a predetermined color that correspondence to predetermined indicia that is readily identifiable by a technician or other individual.

Furthermore, as seen in FIG. 3, an indicator element, in the illustrated embodiment and information or notification tag 60 can be attached to hole 43 in the distal end of device 32 by a plastic loop 62 or other means. Tag 60 can include any useful indicia regarding the wires, the energized devices or so forth. By way of example, tag 60 could include legends such as CRITICAL-TRIP COIL TERMINAL or DO NOT OPERATE. The content of such indicia is limitless. The indicia can be permanently inscribed or can be erasable. Although a tag is shown for convenience and simplicity, any type of indicator element connectable to the device is intended to be included.

It will be appreciated that various changes and modifications may be made in device 32 without departing from the scope of the appended claims. Therefore, the detailed disclosure and accompanying drawings should be considered illustrative of broader aspects of the device and should not be viewed as limiting in any sense

The invention claimed is:

1. A device for covering a functional pair of wire terminals in a terminal block comprising:

a first leg having a distal end and a proximal end configured to cover one of said functional pair of wire terminals, said proximal end having a substantially flat distally angled face;

a second leg having a distal end and a proximal end configured to cover the other of said functional pair of wire terminals, said proximal end having a substantially flat distally angled face, the proximal ends of said first and second legs having marginal surfaces defining opposed serrated laws;

wherein each distally angled flat face terminates in a raised shoulder; and a resilient spring structure connecting said first and second legs;

wherein the device comprises dielectric material.

2. The device of claim 1 wherein the device is a predetermined color, said color corresponding to predetermined indicia.

3. The device of claim 1 wherein the resilient spring structure has a substantially C-shaped configuration.

4. The device of claim 1 wherein the first and second legs are mirror images of each other.

5. The device of claim 1 wherein at least one of said distal ends defines a hole.

6. The device of claim 5 further comprising a connector peg dimensioned to fit within the holes defined in the distal ends of two adjacent devices to connect said devices.

7. The device of claim 5 further comprising an indicator element secured in the hole defined by the distal end of a leg.

8. The device of claim 1 wherein one of the raised shoulders defines a hole.

9. The device of claim 8 further comprising a connector peg dimensioned to fit within the holes defined in the raised shoulders of two adjacent devices to connect said devices.

10. A device for covering a functional pair of wire terminals in an electric terminal block comprising:

a first leg having distal end and a proximal end, said proximal end having a distally angled flat face configured to cover one of said functional pair of wire terminals;

a second leg configured as a mirror image of said first leg and having a distal end and a proximal end, said proximal end configured to cover the other of said function pair of wire terminals; said proximal ends of the legs each define a hole therein; the proximal ends of said first and second legs having marginal surfaces defining opposed, serrated laws; the distal ends of the legs each defining an opening therein;

a resilient spring structure connecting said first and second legs at their approximate midpoints;

a connector peg configured and dimension to engage the holes in the distal ends or the holes in the proximal ends of the device to connect adjacent devices;

wherein the device comprises a dielectric material.

11. The device of claim 10 wherein the device is a predetermined color, said color corresponding to predetermined indicia.

12. The device of claim 10 further comprising an information element attached at the opening in the distal end of one of said legs.

13. In a terminal block having a body and at least one functional pair of opposed wire terminals, a cover/indicator device comprising:

a first leg having distal end and a proximal end, said proximal end having a distally angled flat face configured to cover one of said functional pair of wire terminals;

a second leg having a distal end and a proximal end, said proximal end configured to cover the other of said functional pair of wire terminals;

the proximal ends of said first and second legs each having marginal surfaces defining opposed serrated jaws; and a resilient spring structure connecting said first and second legs;

wherein the device comprise a dielectric material.

14. The device of claim 13 wherein the device is a predetermined color, said color corresponding to predetermined indicia.

15. The device of claim 13 wherein the resilient spring structure has a substantially C-shaped configuration.

* * * * *